(12) United States Patent
Thor

(10) Patent No.: US 7,899,600 B2
(45) Date of Patent: Mar. 1, 2011

(54) TORQUE CONVERTER CLUTCH CONTROL SYSTEM

(75) Inventor: Todd J. Thor, Byron, MI (US)

(73) Assignee: GM Global Technology Operations, Inc.

( * ) Notice: Subject to any disclaimer, the term of this patent is extended or adjusted under 35 U.S.C. 154(b) by 888 days.

(21) Appl. No.: 11/714,686

(22) Filed: Mar. 6, 2007

(65) Prior Publication Data
US 2008/0221765 A1    Sep. 11, 2008

(51) Int. Cl.
*G06F 7/00* (2006.01)
*B60W 10/02* (2006.01)
(52) U.S. Cl. .............. 701/54; 701/68; 477/181
(58) Field of Classification Search ............... 701/99, 701/68, 66, 54, 59; 477/181
See application file for complete search history.

(56) References Cited

U.S. PATENT DOCUMENTS

| 6,042,507 | A  | * | 3/2000 | Genise et al. | 477/181 |
| 7,674,204 | B2 | * | 3/2010 | Turpin et al. | 477/181 |
| 2006/0116236 | A1 | * | 6/2006 | Trush et al. | 477/62 |

FOREIGN PATENT DOCUMENTS

JP        57157859 A     9/1982

* cited by examiner

*Primary Examiner* — Khoi Tran
*Assistant Examiner* — Brian J Broadhead

(57) ABSTRACT

A control system is provided. The control system includes a timer module that receives a first torque converter clutch (TCC) apply request and estimates at least one of a message latency time and a hydraulic latency time. A control module receives a subsequent TCC apply request and generates a torque request for an engine based on the at least one of the hydraulic latency time and the torque message latency time.

20 Claims, 5 Drawing Sheets

TORQUE CONVERTER CLUTCH CONTROL SYSTEM

FIELD

The present disclosure relates to methods and systems for controlling a torque converter clutch.

BACKGROUND

The statements in this section merely provide background information related to the present disclosure and may not constitute prior art.

Automatic transmissions use a fluid clutch known as a torque converter to transfer engine torque from the engine to the transmission. The torque converter operates through hydraulic force provided by pressurized fluid from the automatic transmission. The torque converter multiplies engine torque and directs it through the transmission.

Conventional torque converter systems include one or more variable bleed solenoids (VBS) that control the flow of pressurized fluid from the automatic transmission to the torque converter. Some torque converter systems include a VBS solenoid that controls fluid flow such that enough pressure is generated to lock or partially lock a locking mechanism of the torque converter. Torque converter lock-up is generally performed during cruising speeds to reduce or eliminate torque converter slip. Implementing VBS solenoids in the torque converter system in comparison to other solenoids, such as discrete solenoids, can be costly.

SUMMARY

Accordingly, a control system is provided. The control system includes a timer module that receives a first torque converter clutch (TCC) apply request and estimates at least one of a message latency time and a hydraulic latency time. A control module receives a subsequent TCC apply request and generates a torque request for an engine based on the at least one of the hydraulic latency time and the torque message latency time.

In other features, a method of controlling a torque converter clutch of a torque converter system is provided. The method includes: receiving a first torque converter clutch (TCC) apply request; estimating at least one of a message latency time and a hydraulic latency time; receiving a subsequent TCC apply request; and commanding a torque request for an engine based on the at least one of torque message latency time and hydraulic latency time.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
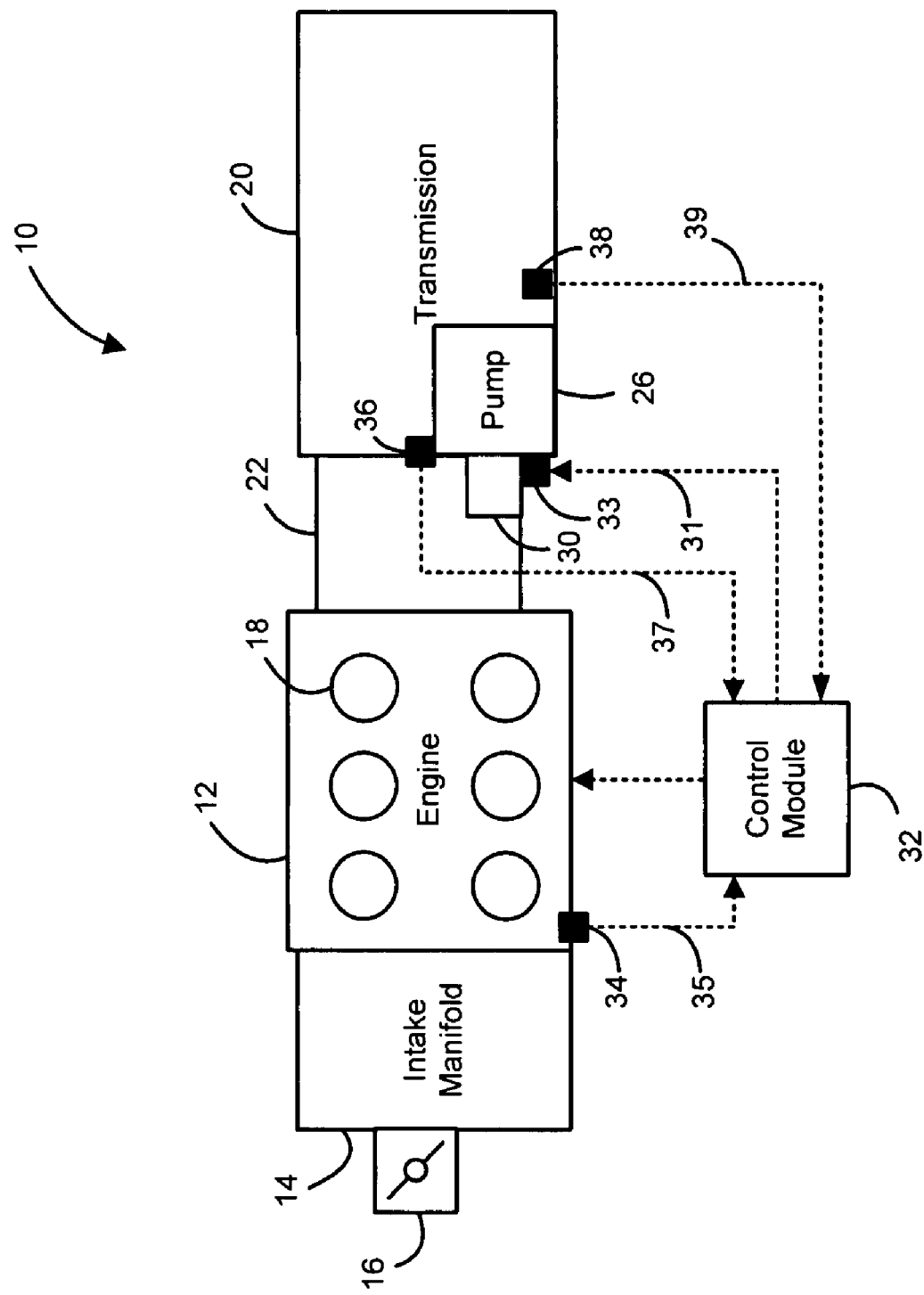
FIG. 1 is a functional block diagram of a vehicle including a torque converter system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

FIG. 1 illustrates a vehicle 10 including a torque converter system according to the present disclosure. The vehicle 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although six cylinders 18 are illustrated, it can be appreciated that the engine can have a plurality of cylinders including, but not limited to, 2, 3, 4, 5, 8, 10, 12 and 16 cylinders.

Torque from the engine 12 is supplied to a transmission 20 through a torque converter 22. The torque converter may be any known lock-up converter including a turbine, a stator, and a torque converter clutch (TCC). The transmission includes a hydraulic pump 26 that regulates pressurized fluid within the transmission 20 and controls fluid flow to and from the torque converter 22 via at least one discrete solenoid-operated valve 30. A fluid line supplies the fluid to the valve and can be orifice restricted such that fluid pressure will rise at a fixed rate. The engine 12 drives the hydraulic pump 26. A current and/or pulse width modulated signal 31 is commanded by a control module 32 to the discrete solenoid 33 in order to vary the supply of pressurized fluid to the torque converter 22. A slip rate of the torque converter 22 is varied based on control of the pressurized fluid.

An engine speed sensor 34 generates an engine speed signal 35 based on a rotational speed of the engine 12. A transmission input speed sensor 36 generates an input speed signal 37 based on a rotational speed of an input shaft (not shown) of the transmission 20. A transmission sump temperature sensor 38 generates a transmission sump temperature signal 39 based on a temperature of transmission fluid in the transmission 20. The control module 32 receives the above-mentioned signals 35, 37, and 39 and controls the one or more discrete solenoids 33 and the engine 12 based on TCC discrete solenoid control systems and methods of the present disclosure.

Figure 2:
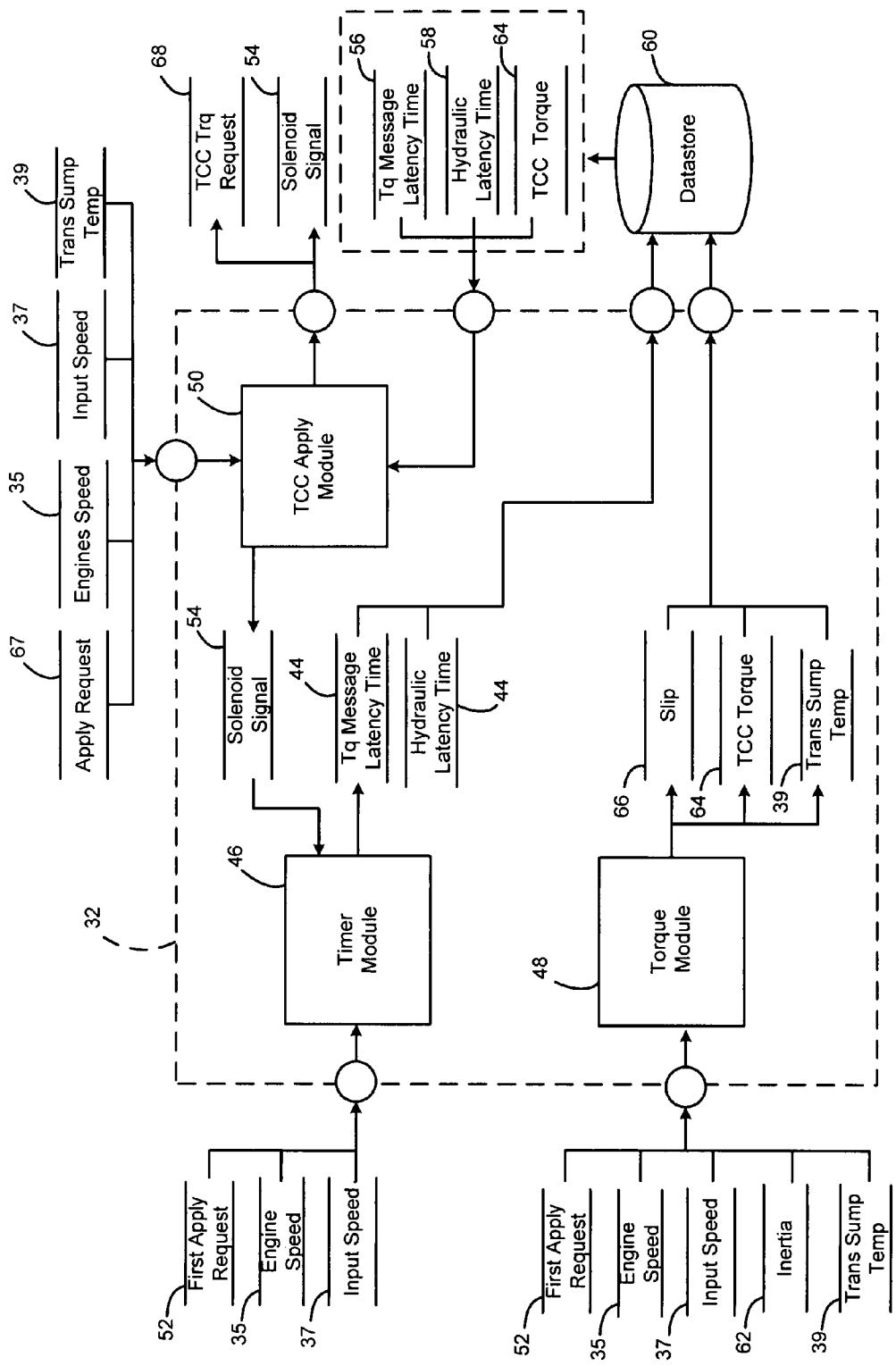
FIG. 2 is a dataflow diagram illustrating a torque converter clutch discrete solenoid control system according to the present disclosure.

Referring to FIG. 2, a dataflow diagram illustrates various embodiments of a TCC discrete solenoid control system that can be embedded within the control module 32. As can be appreciated, various embodiments of TCC discrete solenoid control systems according to the present disclosure may include any number of sub-modules embedded within the control module 32. The modules shown may be combined and/or further partitioned to similarly control the discrete solenoid 33 (FIG. 1) and the engine 12 (FIG. 1). Inputs to the TCC discrete solenoid control system can be sensed from the vehicle 10, received from other control modules (not shown) within the vehicle 10, and/or received from other sub-modules (not shown) within the control module 32. In various embodiments, the TCC discrete solenoid control system of FIG. 2 includes a timer module 46, a torque module 48, and a TCC apply module 50.

The timer module 46 receives as input a first TCC apply request 52, engine speed 35, input speed 37, and a solenoid signal 31. The timer module 46 selectively determines a torque message latency time 56 and a hydraulic latency time 58. More particularly, the timer module 46 selectively determines the torque message latency time 56 to be equal to a difference in time between just before the solenoid signal 31 is generated and a time when a drop in torque converter slip is detected after the solenoid signal 31 is generated. The timer module 46 selectively determines the hydraulic latency time 58 to be equal to a difference in time between just after the discrete solenoid is energized and a time when a drop in torque converter slip is detected. The timer module 46 can determine torque converter slip based on a difference between the engine speed 35 and the input speed 37. The timer module 46 stores the torque message latency time 56 and the hydraulic latency time 58 in a datastore 60 for later use.

The torque module 48 receives as input the first TCC apply request 52, engine speed 35, input speed 37, inertia 62, and transmission sump temperature 39. The torque module 48 selectively computes a TCC torque 64 based on the engine speed 35, the input speed 37, and the inertia 62. More particularly, the torque module 48 selectively computes torque converter slip 66 every X seconds based on a difference between engine speed 35 and input speed 37. The torque module 48 selectively computes the TCC torque 64 based on the inertia 62, a previous slip, a current slip, and the time X. The torque module 48 stores the TCC torque 64 in the datastore 60 as a function of torque converter slip 66 and/or a current transmission sump temperature 39 for later use.

The TCC apply module 50 receives as input subsequent TCC apply requests 67, engine speed 35, input speed 37, and transmission sump temperature 39. The TCC apply module 50 retrieves from the datastore 60 the torque message latency time 56, the hydraulic latency time 58, and the TCC torque 64. More particularly, the TCC apply module 50 determines torque converter slip based on a difference between the engine speed 35 and the input speed 37. Based on torque converter slip and/or the transmission sump temperature 39, the TCC apply module 50 retrieves the TCC torque 64. The TCC apply module 50 generates a torque request 68 based on the TCC torque 64. The torque request 68 is commanded at a time based on the torque message latency time 56 and the hydraulic latency time 58. The solenoid signal 31 is generated based on the subsequent TCC apply requests 67.

Figure 3:
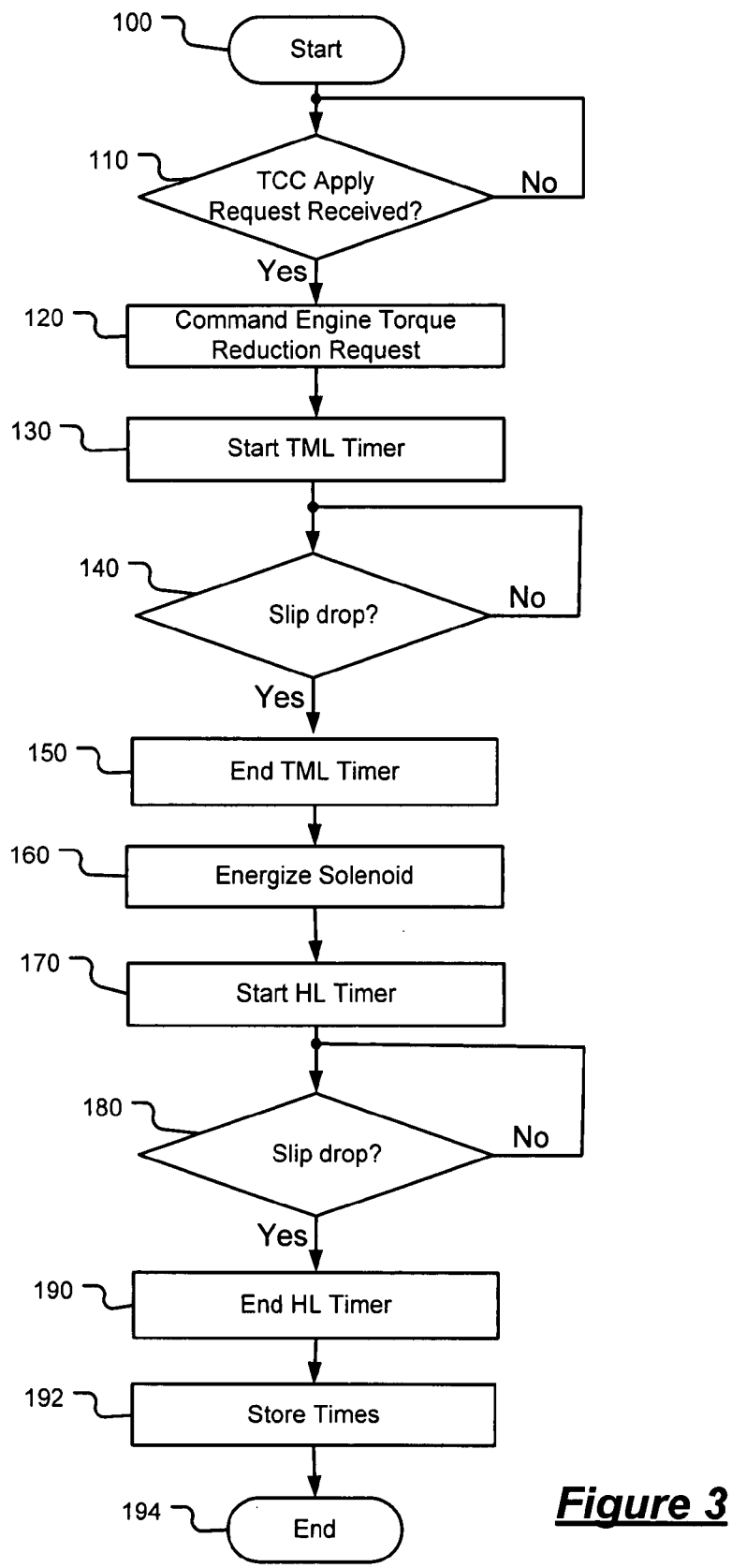
FIG. 3 is a flowchart illustrating a timer initialization method that can be performed by the torque converter clutch discrete solenoid control system according to the present disclosure.

Referring now to FIG. 3, a flowchart illustrates a timer initialization method that can be performed by the TCC discrete solenoid control system of FIG. 2. The method may be scheduled to be performed during a first TCC apply event as indicated by the first TCC apply request 52 or at scheduled events. The method may begin at 100. If the TCC apply request 52 is received at 110, a small engine torque reduction request 68 is commanded at 120 and a torque message latency timer is begun at 130.

At 140, torque converter slip is evaluated. If torque converter slip falls below a predetermined minimum threshold, the torque message latency timer is stopped at 150. Otherwise, if torque converter slip remains above the predetermined minimum threshold at 140, torque converter slip is continually monitored until torque converter slip falls below the predetermined minimum threshold.

An energize solenoid signal 31 is generated that energizes the discrete solenoid 33 (FIG. 1) at 160. Thereafter, a hydraulic latency timer is begun at 170. At 180, torque converter slip is again evaluated. If torque converter slip falls below a predetermined minimum threshold, the hydraulic latency timer is stopped at 190. A value of the two timers is stored as the torque message latency time 56 and the hydraulic latency time 58 respectively in the datastore 60 at 192. Thereafter, the method may end at 194. Otherwise, if torque converter slip remains above the predetermined minimum threshold at 180, torque converter slip is continually monitored until torque converter slip falls below the predetermined minimum threshold.

Figure 4:
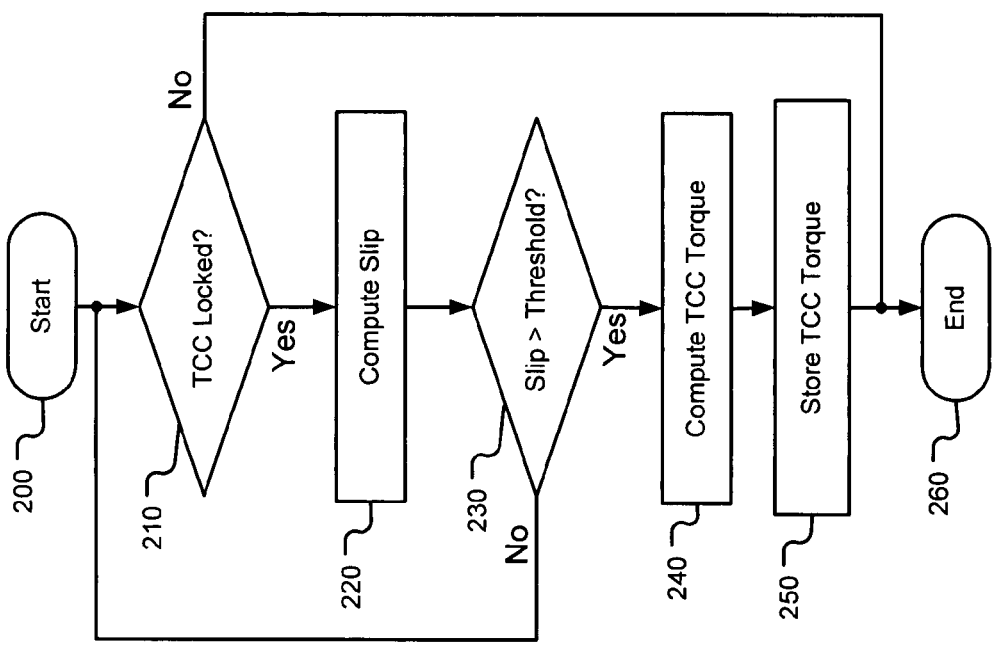
FIG. 4 is a flowchart illustrating a torque converter clutch torque estimation method that can be performed by the torque converter clutch discrete solenoid control system according to the present disclosure.

Referring now to FIG. 4, a flowchart illustrates a TCC torque estimation method that can be performed by the TCC discrete solenoid control system of FIG. 2. The method may be scheduled to be performed periodically during a first TCC apply event as indicated by the first TCC apply request 52. In an exemplary embodiment, the method is scheduled to be performed every fifty milliseconds during the first TCC apply event. The method may begin at 200. A state of the TCC is monitored at 210. If the TCC is locked or partially locked at 210, torque converter slip is computed and evaluated at 220 and 230. Otherwise, if the TCC is not locked or is not partially locked at 210, the method may end at 260.

If torque converter slip is greater than a predetermined slip threshold at 230, TCC torque 64 is computed at 240. Otherwise, if torque converter slip is less than the predetermined slip threshold at 230, the method loops back to evaluate the state of the TCC at 210. In various embodiments, the TCC torque 64 can be computed based on the inertia (Inertia), the previous slip (TCC_Slip$_{PREV}$), the current slip (TCC_Slip$_{CURRENT}$), and the loop time (X). For example, the TCC torque (TCC_TQ) can be computed based on the following equation:

$$TCC\_TQ = Inertia * ((TCC\_Slip_{PREV} - TCC\_Slip_{CURRENT})/X) \quad (1)$$

Once computed, the TCC torque 64 is stored in the datastore 60 at 250. The method may end at 260.

Figure 5:
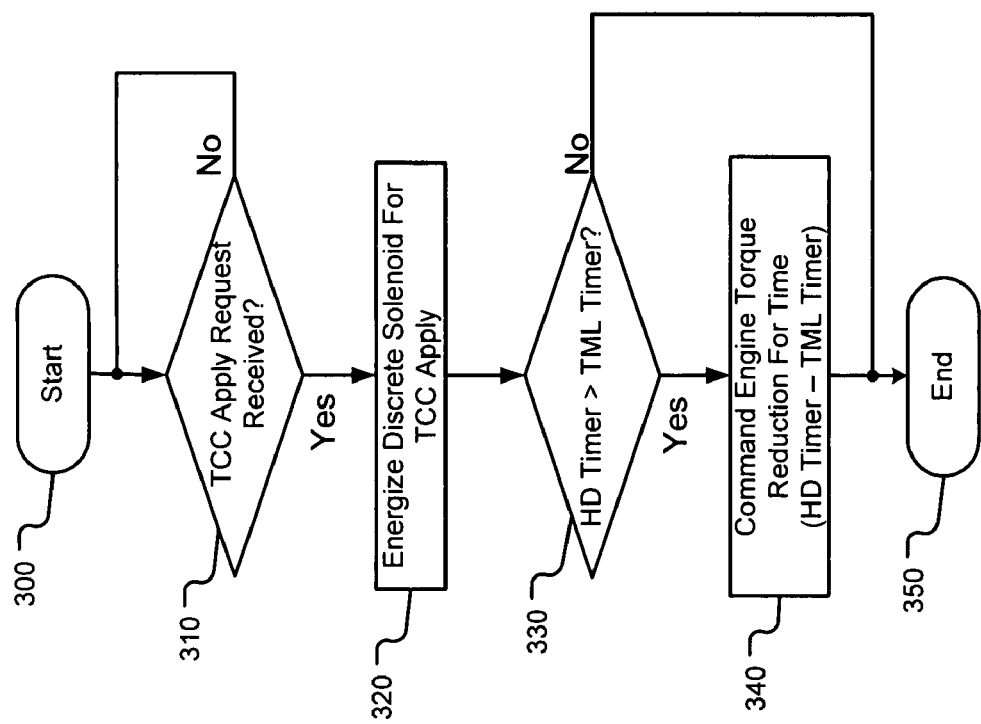
FIG. 5 is a flowchart illustrating a torque converter clutch discrete solenoid control method that can be performed by the torque converter clutch discrete solenoid control system according to the present disclosure.

Referring now to FIG. 5, a flowchart illustrates a torque converter clutch discrete solenoid control method that can be performed by the torque converter clutch discrete solenoid control system of FIG. 2. The method may be performed periodically during vehicle operation and after the first TCC apply event. The method may begin at 300. Once a TCC apply request 52 is received at 310, the solenoid signal 31 is generated to energize the discrete solenoid 33 (FIG. 1) at 320. The hydraulic latency time 58 and the torque message latency time 56 are evaluated at 330. If the hydraulic latency time 58 is greater than the torque message latency time 56 at 330, the torque request 68 is commanded based on the TCC torque 64 determined as a function of torque converter slip and/or transmission sump temperature 39 at 340. The torque request 68 is commanded for a time (Y) that equals the hydraulic latency time 58 minus the torque message latency time 56. Otherwise, if the hydraulic latency time 58 is less than the torque message latency time 56 at 330, the method may end at 360.

As can be appreciated, all comparisons discussed in the methods above can be implemented in various forms depending on the selected values for comparison. For example, a comparison of "greater than" may be implemented as "greater than or equal to" in various embodiments. Similarly, a comparison of "less than" may be implemented as "less than or equal to" in various embodiments.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system, comprising:
a timer module that receives a first torque converter clutch (TCC) apply request and estimates a message latency time and a hydraulic latency time; and
a control module that receives a subsequent TCC apply request and generates a torque request for an engine based on the hydraulic latency time and the message latency time.

2. The control system of claim 1 further comprising a torque module that receives the first TCC apply request and estimates a torque converter clutch torque, wherein the control module generates the torque request for the engine based on the torque converter clutch torque.

3. The control system of claim 1 wherein the control module generates a solenoid signal for a solenoid of a torque converter system based on the subsequent TCC apply request.

4. The control system of claim 1 wherein the timer module estimates the message latency time based on a time before a solenoid signal is commanded and a time when a decrease in torque converter slip is detected after the solenoid signal is generated.

5. The control system of claim 1 wherein the timer module estimates the hydraulic latency time based on a time after a discrete solenoid signal is commanded and a time when a decrease in torque converter slip is detected.

6. The control system of claim 2 wherein the torque module estimates the torque converter clutch torque based on inertia and torque converter slip.

7. The control system of claim 1 wherein when the hydraulic latency time is greater than the message latency time, the control module generates the torque request during a first period, wherein the first period is equal to a difference between the hydraulic latency time and the message latency time.

8. A vehicle including a torque converter system, comprising:
a torque converter;
at least one discrete solenoid that controls flow of pressurized fluid to the torque converter; and
a control module that generates a solenoid signal to operate the discrete solenoid and that generates a torque request to control engine torque while operating the discrete solenoid, wherein the control module generates the torque request at a time based on a hydraulic latency time and a message latency time.

9. The vehicle of claim 8 wherein the control module estimates the message latency time based on a time before the solenoid signal is commanded and a time when a decrease in torque converter slip is detected after the solenoid signal is generated.

10. The vehicle of claim 8 wherein the control module estimates the hydraulic latency time based on a time after the solenoid signal is commanded and a time when a decrease in torque converter slip is detected.

11. The vehicle of claim 8 wherein the control module generates the torque request based on a torque converter clutch torque that is determined as a function of torque converter slip.

12. The vehicle of claim 8 wherein the control module generates the torque request based on a torque converter clutch torque that is determined as a function of torque converter slip and transmission sump temperature.

13. The vehicle of claim 11 wherein the control module estimates the torque converter clutch torque based on inertia and torque converter slip.

14. A method of controlling a torque converter clutch of a torque converter system, comprising:
receiving a first torque converter clutch (TCC) apply request;
estimating a message latency time and a hydraulic latency time;
receiving a subsequent TCC apply request; and
commanding a torque request for an engine based on the message latency time and hydraulic latency time.

15. The method of claim 14 further comprising generating a solenoid signal to a discrete solenoid of the torque converter system based on the subsequent TCC apply request.

16. The method of claim 14 wherein the estimating the message latency time is based on a time before a solenoid signal is commanded and a time when a decrease in torque converter slip is detected after the solenoid signal is generated.

17. The method of claim 14 wherein the estimating the hydraulic latency time is based on a time after a discrete solenoid signal is commanded and a time when a decrease in torque converter slip is detected.

18. The method of claim 14 further comprising estimating a torque converter clutch torque, wherein the commanding the torque request is based on the torque converter clutch torque.

19. The method of claim 18 wherein the estimating the torque converter clutch torque is based on inertia, a previous slip, a current slip, and a loop execution time.

20. The method of claim 14 wherein the generating the torque request comprises, when the hydraulic latency time is greater than the message latency time, generating the torque request during a first period, wherein the first period is equal to a difference between the hydraulic latency time and the message latency time.

* * * * *